US008294865B2

(12) United States Patent
Chang et al.

(10) Patent No.: US 8,294,865 B2
(45) Date of Patent: Oct. 23, 2012

(54) COMMON BUS DESIGN FOR A TFT-LCD DISPLAY

(75) Inventors: Shih Chang Chang, Cupertino, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/405,226

(22) Filed: Feb. 24, 2012

(65) Prior Publication Data
US 2012/0154731 A1    Jun. 21, 2012

Related U.S. Application Data

(62) Division of application No. 12/340,567, filed on Dec. 19, 2008, now Pat. No. 8,144,295.

(60) Provisional application No. 61/199,710, filed on Nov. 18, 2008.

(51) Int. Cl.
    *G02F 1/1343*    (2006.01)
(52) U.S. Cl. ....................................................... 349/141
(58) Field of Classification Search .................. None
    See application file for complete search history.

(56) References Cited

U.S. PATENT DOCUMENTS

| 4,542,960 A | 9/1985 | Yang |
| 4,916,308 A | 4/1990 | Meadows |
| 5,105,186 A | 4/1992 | May |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,838,308 A | 11/1998 | Knapp et al. |
| 5,844,644 A | 12/1998 | Oh et al. |
| 5,880,411 A | 3/1999 | Gillespie et al. |
| 6,057,903 A | 5/2000 | Colgan et al. |
| 6,177,918 B1 | 1/2001 | Colgan et al. |
| 6,188,391 B1 | 2/2001 | Seely et al. |
| 6,204,897 B1 | 3/2001 | Colgan et al. |
| 6,281,957 B1 | 8/2001 | Oh et al. |

(Continued)

FOREIGN PATENT DOCUMENTS
EP    1 133 057 A2    9/2001
(Continued)

OTHER PUBLICATIONS
Non-Final Office Action mailed May 15, 2012, for U.S. Appl. No. 12/315,869, filed Dec. 5, 2008, 14 pages.
(Continued)

*Primary Examiner* — Lucy Chien
(74) *Attorney, Agent, or Firm* — Morrison & Foerster LLP

(57) ABSTRACT

Embodiments of the present invention provide for a FFS TFT LCD with a high refresh rate without limiting the aperture of individual pixels. More specifically, embodiments of the invention provide for the use of common bus lines to reduce the effective resistance of the common electrode and to therefore allow for higher refresh rates of the display. Furthermore, the common bus lines can be positioned in such a manner so that they do not further reduce the aperture of the display. More specifically, the common bus lines can be positioned above or below existing elements of the display that are already opaque. Thus, adding the common bus lines need not reduce the aperture. The above can be achieved by, for example, placing the common bus lines above or below existing non-transparent lines, such as gate lines or data lines.

28 Claims, 7 Drawing Sheets

U.S. PATENT DOCUMENTS

| | | | |
|---|---|---|---|
| 6,310,610 B1 | 10/2001 | Beaton et al. | |
| 6,323,846 B1 | 11/2001 | Westerman et al. | |
| 6,483,498 B1 | 11/2002 | Colgan et al. | |
| 6,501,529 B1 | 12/2002 | Kurihara et al. | |
| 6,646,706 B2 | 11/2003 | Lim et al. | |
| 6,646,707 B2 | 11/2003 | Noh et al. | |
| 6,680,448 B2 | 1/2004 | Kawashima et al. | |
| 6,690,387 B2 | 2/2004 | Zimmerman et al. | |
| 6,762,815 B2 * | 7/2004 | Lee | 349/141 |
| 7,015,894 B2 | 3/2006 | Morohoshi | |
| 7,042,444 B2 | 5/2006 | Cok | |
| 7,133,032 B2 | 11/2006 | Cok | |
| 7,184,064 B2 | 2/2007 | Zimmerman et al. | |
| 7,202,856 B2 | 4/2007 | Cok | |
| 7,230,608 B2 | 6/2007 | Cok | |
| 7,280,167 B2 | 10/2007 | Choi et al. | |
| 7,379,054 B2 | 5/2008 | Lee et al. | |
| 7,663,607 B2 | 2/2010 | Hotelling et al. | |
| 8,144,295 B2 | 3/2012 | Chang et al. | |
| 2001/0013915 A1 | 8/2001 | Song | |
| 2001/0020578 A1 | 9/2001 | Baier | |
| 2002/0084992 A1 | 7/2002 | Agnew | |
| 2002/0159016 A1 | 10/2002 | Nishida et al. | |
| 2004/0109097 A1 | 6/2004 | Mai | |
| 2004/0141096 A1 | 7/2004 | Mai | |
| 2004/0189587 A1 | 9/2004 | Jung et al. | |
| 2005/0052582 A1 | 3/2005 | Mai | |
| 2005/0231487 A1 | 10/2005 | Ming | |
| 2005/0243023 A1 | 11/2005 | Reddy et al. | |
| 2005/0243228 A1 | 11/2005 | Lee et al. | |
| 2005/0270435 A1 | 12/2005 | Shiau et al. | |
| 2006/0007165 A1 | 1/2006 | Yang et al. | |
| 2006/0026521 A1 | 2/2006 | Hotelling et al. | |
| 2006/0097991 A1 | 5/2006 | Hotelling et al. | |
| 2006/0145365 A1 | 7/2006 | Halls et al. | |
| 2006/0146033 A1 | 7/2006 | Chen et al. | |
| 2006/0146034 A1 | 7/2006 | Chen et al. | |
| 2006/0197753 A1 | 9/2006 | Hotelling | |
| 2006/0203151 A1 | 9/2006 | Kim | |
| 2006/0244736 A1 | 11/2006 | Tseng | |
| 2007/0018969 A1 | 1/2007 | Chen et al. | |
| 2007/0075977 A1 | 4/2007 | Chen et al. | |
| 2007/0097278 A1 | 5/2007 | Rho et al. | |
| 2007/0176905 A1 | 8/2007 | Shih et al. | |
| 2007/0216657 A1 | 9/2007 | Konicek | |
| 2007/0262967 A1 | 11/2007 | Rho | |
| 2008/0048994 A1 | 2/2008 | Lee et al. | |
| 2008/0055221 A1 | 3/2008 | Yabuta et al. | |
| 2008/0055268 A1 | 3/2008 | Yoo et al. | |
| 2008/0067528 A1 | 3/2008 | Choi et al. | |
| 2008/0074401 A1 | 3/2008 | Chung et al. | |
| 2008/0129898 A1 | 6/2008 | Moon | |
| 2008/0136980 A1 | 6/2008 | Rho et al. | |
| 2008/0150901 A1 | 6/2008 | Lowles et al. | |
| 2008/0158172 A1 | 7/2008 | Hotelling et al. | |
| 2008/0309627 A1 | 12/2008 | Hotelling et al. | |
| 2010/0001973 A1 | 1/2010 | Hotelling et al. | |
| 2010/0123866 A1 | 5/2010 | Chang et al. | |
| 2010/0144391 A1 | 6/2010 | Chang et al. | |

FOREIGN PATENT DOCUMENTS

| | | |
|---|---|---|
| EP | 1 133 057 A3 | 9/2001 |
| EP | 1 133 057 B1 | 9/2001 |
| EP | 1 422 601 A1 | 5/2004 |
| EP | 1 455 264 A2 | 9/2004 |
| EP | 1 455 264 A3 | 9/2004 |
| EP | 1 939 673 A1 | 7/2008 |
| JP | 2000-163031 A | 6/2000 |
| JP | 2002-342033 A | 11/2002 |
| WO | WO-85/03374 A1 | 8/1985 |
| WO | WO-2004/046905 A2 | 6/2004 |
| WO | WO-2004/046905 A3 | 6/2004 |
| WO | WO-2005/036510 A1 | 4/2005 |
| WO | WO-2007/146785 A2 | 12/2007 |
| WO | WO-2007/146785 A3 | 12/2007 |
| WO | WO-2010/065424 A2 | 6/2010 |
| WO | WO-2010/065424 A3 | 6/2010 |

OTHER PUBLICATIONS

Final Office Action mailed Jul. 14, 2011, for U.S. Appl. No. 12/340,567, filed Dec. 19, 2008, eight pages.

International Search Report mailed Nov. 12, 2010, for PCT Application No. PCT/US2009/065978, filed Nov. 25, 2009, four pages.

Kanda, Eiji, et al., 55.2 Integrated Active Matrix Capacitive Sensors for Touch Panel LTPS-TFT LCDs, SID 08 Digest, 2008, pp. 834-837, Fujimi, Nagano, Japan.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Lee, Seung, et al., Ultra-FFS TFT-LCD with Super Image Quality, Fast Response Time, and Strong Pressure-Resistant Characteristics, Journal of the SID, 2002, pp. 117-122.

Non-Final Office Action mailed Feb. 14, 2011, for U.S. Appl. No. 12/340,567, filed Dec. 19, 2008, nine pages.

Notice of Allowance mailed Jan. 17, 2012, for U.S. Appl. No. 12/340,567, filed Dec. 19, 2008, 10 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

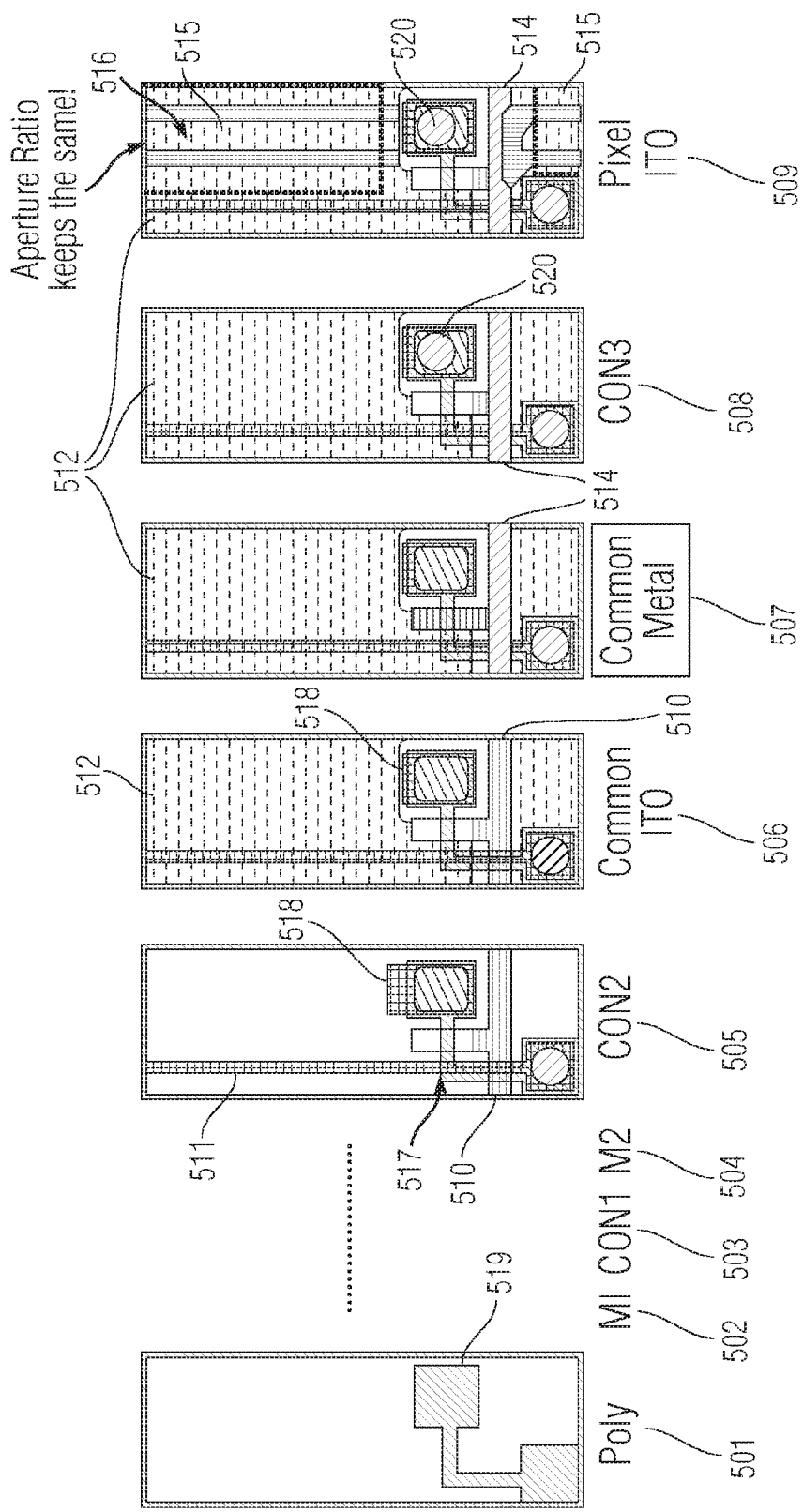

COMMON BUS DESIGN FOR A TFT-LCD DISPLAY

CROSS-REFERENCE TO RELATED APPLICATIONS

This application is a divisional of U.S. patent application Ser. No. 12/340,567, filed Dec. 19, 2008, which in turn claims the benefit under 35 USC 119(e) of U.S. Provisional Application No. 61/199,710, filed on Nov. 18, 2008, the entire disclosures of which are incorporated herein by reference in their entirety for all purposes.

FIELD OF THE INVENTION

This relates generally to thin-film transistor liquid crystal displays (TFT LCDs) and more specifically, to fringe field switching (FFS) TFT LCDs that include an improved common bus design that allows for reduced resistance at the common electrode and higher display refresh rate.

BACKGROUND OF THE INVENTION

Thin film transistor liquid crystal displays (TFT LCDs) are a well known type of displays. One advanced type of TFTLCD is the fringe field switching TFT LCD, or FFS TFTLCD. Fringe field switching is considered to be a type of in-plane switching LCD; i.e., an LCD for which the electrodes performing the switching of pixels are in a single plane and formed on a single substrate on one side of the liquid crystals. (Other LCD technologies require that electrodes be placed in a "sandwich" configuration on two different substrates on both sides of the liquid crystals). An example of an FFS TFT LCD is described by Lee, Seung Hee et al., "Ultra-FFS TFT-LCD with Super Image Quality, Fast Response Time, and Strong Pressure-Resistant Characteristics," Journal of the Society for Information displays Oct. 2, 2002. The above publication is hereby incorporated by reference herein in its entirety for all purposes.

Furthermore, FFS LCDs usually require the use of a common layer. The common layer can be a single electrode that is used for switching all pixels. Thus, the common layer can be referred to as a common electrode. Each pixel may also include a pixel electrode and the switching of a pixel may be performed by varying a voltage between individual pixel electrodes and the common electrode. In some embodiments different common electrodes may be used for different rows of pixels.

The common electrode can be the same for all pixels (or, alternatively, all pixels in a particular row) and need not be individually switched for individual pixels. Each pixel electrode can be individually switched by the use of a transistor connected to a data and gate line. A plurality of gate and data lines can be provided in a lattice covering the display so that each pixel is connected to a respective gate and data line. This may allow the switching of individual pixel electrodes. Switching of an electrode indicates loading and/or removing charge to/from the electrode in order to change the voltage of an electrode.

Because of the need to use higher resistance transparent conductors to form the common electrode, the switching rate of the common electrode and, subsequently, the refresh rate of the display can be limited. Furthermore, to minimize the amount of current that has to flow across these higher resistance paths, FFS TFT LCDs are usually limited in size.

SUMMARY OF THE INVENTION

Embodiments of the present invention provide for a FFS TFT LCD with a high refresh rate without limiting the aperture of individual pixels. More specifically, embodiments of the invention provide for the use of common bus lines to reduce the effective resistance of the common electrode and to therefore allow for higher refresh rates of the display. Furthermore, the common bus lines can be positioned in such a manner so that they do not further reduce the aperture of the display. More specifically, the common bus lines can be positioned above or below existing elements of the display that are already opaque. Thus, adding the common bus lines need not reduce the aperture. The above can be achieved by, for example, placing the common bus lines above or below existing non-transparent lines, such as gate lines or data lines.

BRIEF DESCRIPTION OF THE DRAWINGS

FIG. 5 is a diagram of various manufacturing stages of an exemplary display according to one embodiment of the invention.

DETAILED DESCRIPTION OF THE PREFERRED EMBODIMENTS

Figure 1A:
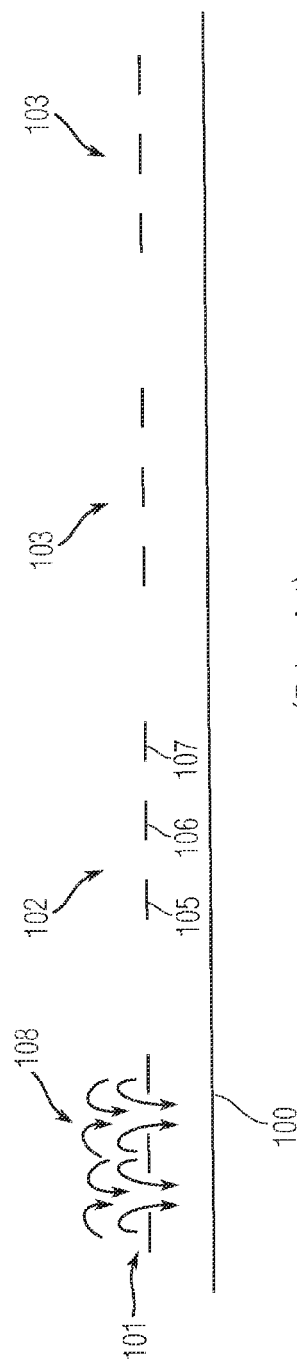
FIGS. 1A and 1B are diagrams showing exemplary configurations of the common and pixel electrode.

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the present invention provide for the ability to reduce the effective resistance of the common electrode without reducing the aperture of the display. In other words, embodiments of the invention allow for relatively quick voltage changes at the common electrode without reducing the light transmitting portions of the display. Embodiments of the invention can produce FFS TFT LCDs that have high refresh rates, are relatively bright and feature relatively wide viewing angles. These benefits can also be extended to relatively large FFS TFT LCDs.

The above can be achieved by using opaque low resistance common buses that are specifically positioned so as to not to significantly reduce the aperture of the display. More specifically, these buses can be positioned directly above or below another pre-existing opaque feature. In other words, the common buses can be positioned in an area that is already removed from the aperture, and consequently they need not cause further reductions in the aperture. For example, the common buses can be positioned at the same layer as the common electrode, which is usually above or below the gate and data lines. The common buses can then be lined up directly above and in parallel with the gate or data lines.

Although embodiments of the invention may be described and illustrated herein in terms of FFS TFT LCDs, they can be used in other types of devices. For example, embodiments may be used in any display that features a relatively large electrode that must be made from a transparent material with relatively high resistance and that changes its voltage often.

In a TFT LCD, the state of a display pixel (i.e., the tendency of a pixel to transmit or block light) depends on the voltage between that pixel's pixel electrode and the common electrode. The states of individual pixels can be changed by individually switching various pixel electrodes.

The common electrode, being common to all pixels, can extend over the entire display (or majority thereof) in order to extend over all pixels. Alternatively, the common electrode can extend over an entire row only. The common electrode can be either positioned under or over the pixel electrodes. If it is positioned under the pixel electrodes, the common electrode can be a solid layer. If it is positioned over the pixel electrodes, the common electrode can include comb-like portions that are over the pixel electrodes.

The common and pixel electrodes can be made of a transparent conductor, such as indium tin oxide (ITO). They are transparent in order to allow light from a backlight to pass through them and proceed to the liquid crystals and color filters in order to perform the display functionality. Although ITO is a conductor, ITO has a higher resistance than various non-transparent conductors, such as non-transparent metal. For this reason, the gate and data lines are usually made out of such metal. Therefore, various portions of the display (such as the portions where the gate and data lines are positioned) are opaque or dark and cannot perform any display functionality. These portions are also referred to as the black mask. The portions that perform the display functionality are referred to as the aperture of the display. The black mask and the aperture are usually distinct, i.e., they do not overlap.

It is usually desirable to increase the relative size of the aperture and decrease that of the black mask. A larger aperture allows for brighter and clearer displays, as well as displays that are viewable from a wider range of angles.

As noted above, the common electrode is common for all pixels (or a row thereof), and its voltage need not be individually switched per pixel. However, for various reasons, some modern displays do not keep the voltage of the common electrode constant. Instead they vary it with time (such as, for example, after each refresh). Thus, the voltage of the common electrode can vary between 5V, −5V, 5V, etc. Due to the large size of the common electrode, varying the voltage in such a manner requires significant amounts of electrical charge to be moved on and off various parts of the common electrode. This may require that significant current pass through the common electrode. However, the common electrode can be made out of a transparent conductor that has relatively high resistance for a conductor. Thus, there may be practical limits to the amount of current that can pass through the common electrode without generating too much heat.

When the current is limited, it may take more time to place the common electrode in the desired voltage. This may in turn limit the refresh rate of the display. However, the refresh rate is an important factor influencing the quality of a display. Displays of higher refresh rates look better and are less likely to cause headaches for the viewer.

The above problem becomes more severe as the size of the display increases. A larger display means a larger common electrode or electrodes, which means that more electrical charge must be applied to or removed from the common electrode in order to bring it to a desirable voltage. This exacerbates the problem of the high resistance of the common electrode. For the above reason, most existing FFS TFT LCDs are relatively small.

Some existing displays use common bus lines to address the above issue. Common bus lines (or buses) are usually metal lines positioned on the same layer as the gate and or data lines and connected to the common electrode at multiple locations. Common buses provide a low resistance connection to transport current between various parts of the common electrode (and, optionally, an electrical source) and thus compensate for the relatively high resistance of the common electrode. Thus, common buses allow for the voltage of the common electrode to be switched faster. However, common buses are opaque and can take up additional space on the surface of the display. Thus, common buses usually reduce the viewable real estate, or the aperture, of the display. As noted above, reduction of the aperture results in a darker display that may be viewable from a narrower range of angles. However, as discussed below, embodiments of the present invention allow for a decreased effective resistance of the common electrode without reducing the aperture.

Figure 1B:
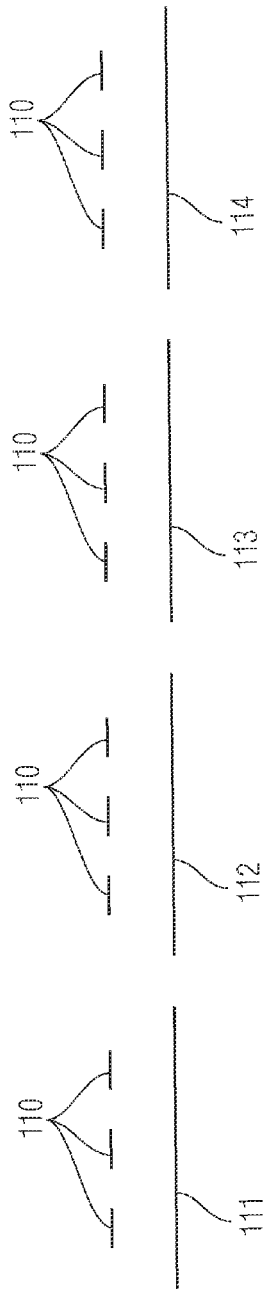

FIGS. 1A and 1B are diagrams showing exemplary configurations of the common and pixel electrodes. FIGS. 1A and 1B show side sections of an exemplary display. FIG. 1A shows a "common electrode on the bottom" configuration and FIG. 1B shows a "common electrode on the top" configuration. It should be noted that to improve clarity, FIGS. 1A and 1B do not show other known elements of the display such as gate and data lines, transistors, etc.

In FIG. 1A, the common electrode is electrode 100. Multiple pixel electrodes 101-104 can be positioned above it. Each pixel electrode can include two or more "fingers" or extensions. Thus, for example, fingers 105, 106 and 107 can be part of pixel electrode 102. The fingers of a single pixel electrode can be interconnected to form a single electrode (this connection is not shown in the cross section of FIG. 1A). When a pixel electrode is at a different voltage than the common electrode 100, electrical fields appear between the pixel electrode and the common electrode. Some of these extend above the pixel electrode (see, e.g., fields 108 of electrode 101) and can control liquid crystals above the pixel electrode in order to change the visible state of a pixel associated with the pixel electrode. The voltage of each pixel electrode can be individually changed to control the color (or brightness) of a particular pixel, while the single common electrode 100 can be maintained at a single voltage for all pixels (although some displays can use a plurality of different common electrodes for different rows).

FIG. 1B shows a common electrode on top configuration. In this case, pixel electrodes 111, 112, 113 and 114 can be positioned along the bottom of the display. As shown, the pixel electrodes need not be separated into fingers. The common electrode 110 can be positioned over the pixel electrodes and form sets of fingers over each pixel electrode. All the fingers of the common electrode can be connected, thus forming a single common electrode 110. The three fingers 110 above pixel electrode 111 can be connected to fingers 110 above pixel electrodes 112, 113 and 114. Again this connection is not shown in the cross section of FIG. 1B. However, as noted above, some embodiments may feature different common electrodes on different lines. Thus, the common electrode on the top embodiment is not a single solid plate but can be cut into stripes in order to allow for the forming of fingers.

As noted above, ordinary display operation may require that the voltage of the common electrode change with each frame. However, the configurations shown in FIGS. 1A and 1B may both suffer from relatively high resistance within and/or across the common electrode. Higher common electrode resistances may limit the speed at which the voltage at the common electrode changes, and may limit the refresh rate of the display. This issue is especially acute with the common electrode on top configuration of FIG. 1B, because this configuration features a common electrode that is cut so that it can form fingers. This reduces the conducting volume of the common electrode, resulting in an even higher resistance.

Various solutions have been proposed to solve the above issue. One existing way to address this is to use common bus lines to reduce the resistance at the common electrode. Common bus lines can be connected to the common electrode at multiple locations and can be made from a low resistance non-transparent conductor, such as non-transparent metal. One such system is described by U.S. Pat. No. 6,646,706 issued to Lim et al. (hereinafter "Lim") and is hereby incorporated herein by reference in its entirety for all purposes.

Figure 2:
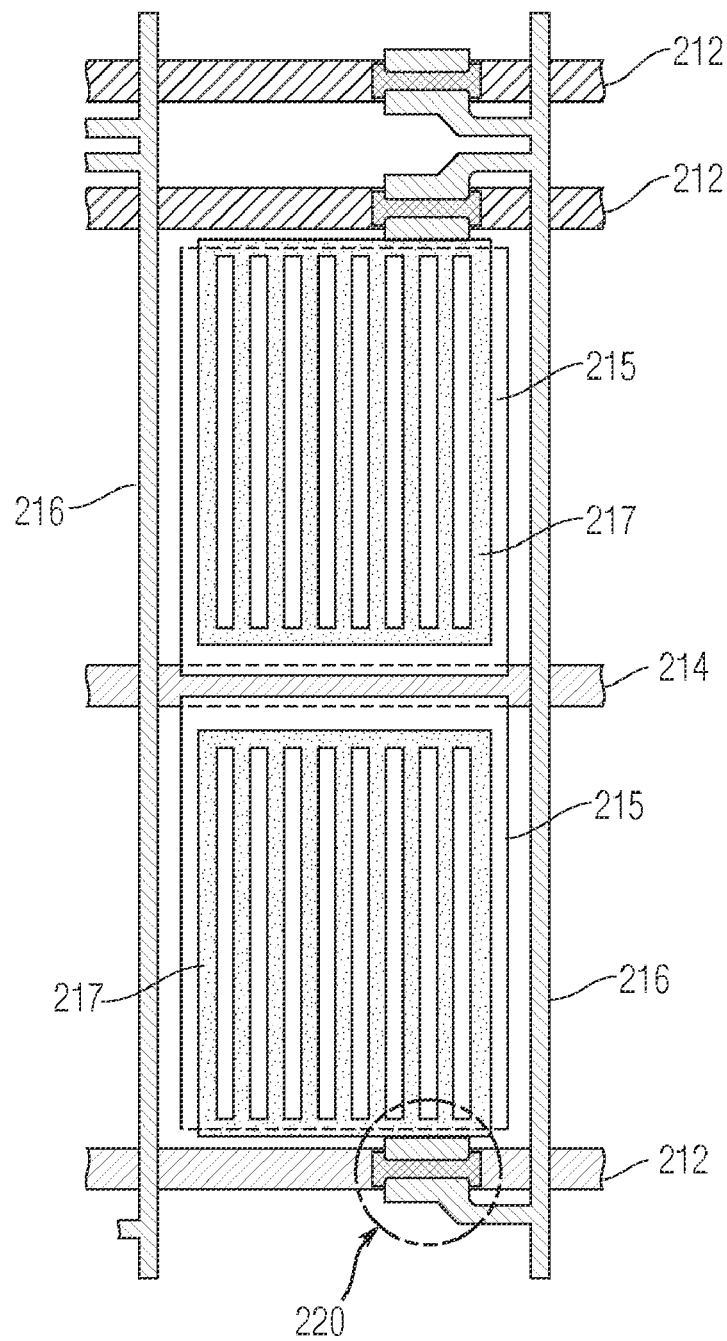
FIG. 2 illustrates is a diagram showing an exemplary display using a common bus line.

FIG. 2 shows an exemplary display similar to the one disclosed by Lim and other existing displays that utilize a common bus. FIG. 2 shows a common electrode on bottom design, but a person of skill in the art would recognize that a similar design can be developed for the common electrode on the top configuration. FIG. 2 shows a top view of two pixels. It includes three horizontal gate lines 212, and two vertical data lines 216. The common electrodes for the two pixels are planar structures 215, while the pixel electrodes are comb-like structures 217. Structures 217 can be considered similar to "teeth" structures 101-104 of FIG. 1A, discussed above.

Included also is a non-transparent metal line 214. This is the common bus. In this embodiment, the common bus is positioned at the same layer as the gate lines 212 and is connected to the common electrode plates 215 (thus connecting them into a single common electrode). While the common electrode plates 215 are made of a transparent material that may have a relatively high resistance (such as ITO), the common bus line is made of non-transparent metal with relatively low resistance. Thus, the common bus reduces the effective resistance of the common electrode plates.

However, the system of Lim does present some disadvantages. Because the common bus 214 is non-transparent, it actually blocks light generated by the display's back light from passing through it. Thus, the area covered by the common bus 214 is area that cannot be used for display purposes; in other words, it is part of the black mask.

If, for example, the common bus line 214 did not exist, a larger area of the display could be used to perform the display function. For example, both comb pixel electrodes 217 could be extended towards the center. This can be used to increase the area that is used to perform the display functionality or, in other words, increase the aperture. Therefore, the existence of the common bus 214 can be considered as effectively decreasing the aperture from the non-common bus alternative. As noted above, a decreased aperture can cause various disadvantages such as decreased viewing angle and decreased brightness of the display.

Embodiments of the present invention solve the above issues by placing the common bus lines in areas that are already part of the black mask (i.e., areas that would be part of the black mask even if no common bus were used). Thus, the placement of a common bus line need not reduce the aperture area. In some embodiments, the common bus line need not be placed in areas that are entirely within the existing black mask, so there may be some slight reduction of the aperture.

The above can be achieved by, for example, placing the common bus lines above or below existing non-transparent lines, such as the gate lines or the data lines. In most existing displays, the gate and data lines are made of non-transparent metal, so the area they cover cannot be used for display purposes (i.e., it is part of the black mask). Thus, placing additional non-transparent elements in that area (whether above or below) need not increase the size of the black mask, and thus need not reduce the aperture. In other embodiments, the common bus line can be placed above or below other non-transparent elements, such as elements of a thin film transistor.

Figure 3:
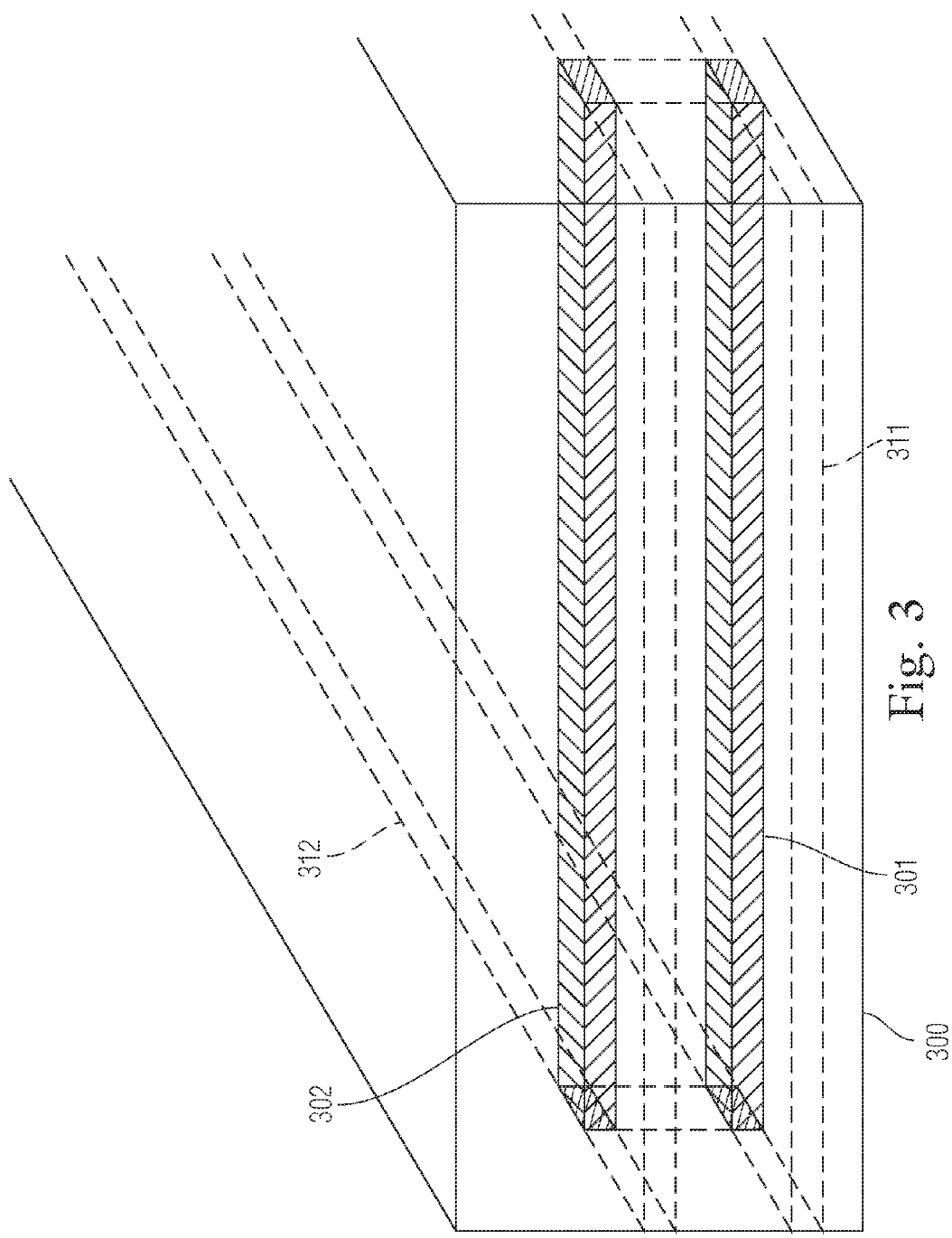
FIG. 3 is a diagram showing an exemplary display using a common bus line according to one embodiment of this invention.

FIG. 3 shows an example of a display according to some embodiments of the invention. Substrate assembly 300 is the TFT layer of the display. The substrate assembly 300 can include a glass substrate and various electronic elements formed thereon. More specifically, the substrate 300 can include various different layers that include display elements such as data lines, gate lines, TFTs, common and pixel electrodes, etc. In the interest of clarity only gate line 301 and common bus line 302 are shown. As seen, gate line 301 is part of layer 311 of the substrate assembly, while common bus line 302 is part of layer 312 which is different than layer 311. Furthermore, the common bus line is substantially parallel to the gate line and is positioned above the gate line. Thus, the non-transparent common bus line need not block any usable aperture in excess of that already blocked by the gate line. In other words, the addition of the common bus line need not reduce the aperture of the display.

Various embodiment of the invention may differ from those shown in FIG. 3. For example, the common bus line may be positioned below the gate line. Alternatively, the common bus line may be positioned parallel to and above or below a data line. Also, the common bus line can be positioned parallel to and above or below any other non-transparent line or other element or elements that may already be present in the display. Additional common bus lines can exist and may be positioned in parallel with and directly above or below other respective gate or data lines or other elements.

Some embodiments of the present invention may not require exact overlap between respective common bus lines and gate or data lines. For example, the common bus line can be narrower than, wider than, or slightly displaced from a respective gate or data line. For some embodiments, it is sufficient that the common bus line substantially overlaps another non-transparent element(s) in the display to ensure that the addition of the common bus line does not cause significant decrease of aperture. For example, the overlap can be such that only 70% of the common bus line is directly above or below a respective other non-transparent line or element.

It should be noted that in this disclosure, the term overlap refers to the ability of an opaque element (such as a gate line, data line, or another element) to "cover" the common bus line. Thus, a substantial overlap may indicate that certain significant percentage of the common bus line is covered (such as, e.g., 70%) by other opaque elements, and a complete overlap (which includes a substantial overlap) takes place when the entire common bus line is covered. For the term overlap, as defined herein, it need not be significant whether the common bus line is positioned over the other opaque element(s) or under them. Furthermore, only the ability of other elements to cover the common bus line may be considered significant. If the common bus line fails to cover large portions of other elements, this need not be considered relevant for determining overlap.

The common bus line 302 can be connected to the common electrode at one or more points in order to decrease its effective resistance. Furthermore, the common bus line can be connected to a driver configured to change the voltage of the common electrode. If multiple common electrodes are present (e.g., in the case of a different common electrode for each row of the display) multiple common bus lines can be used and can connect to respective common electrodes and drivers. Furthermore, multiple parallel common electrode bus lines can be used even in the case of a single common electrode in order to further decrease the effective resistance of the common electrode.

Figure 4A:
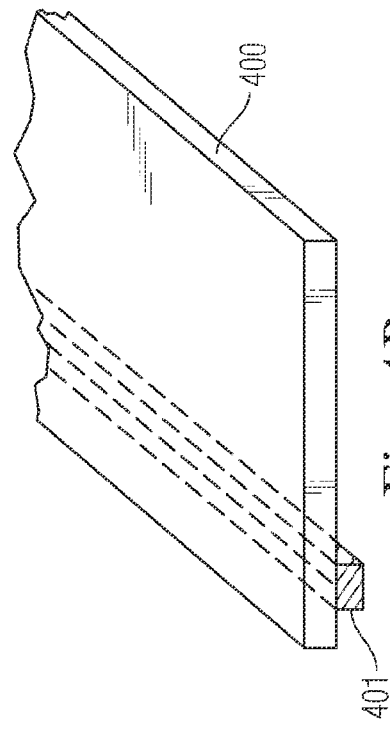
FIGS. 4A-D are diagrams showing various configurations of the common bus line and the common electrode according to some embodiments of the invention.
Figure 4B:
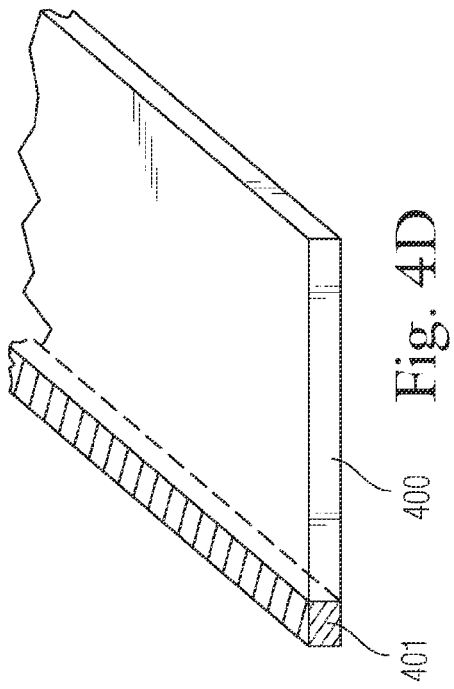
Figure 4C:
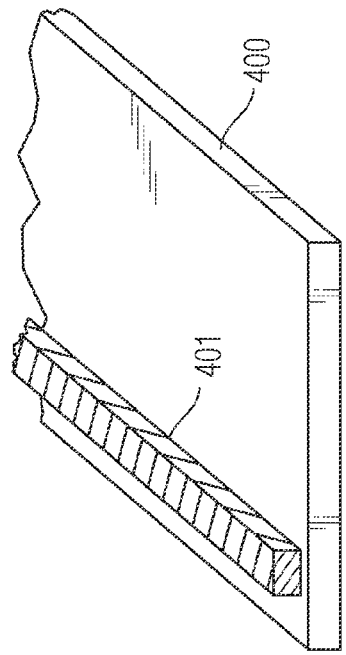
Figure 4D:
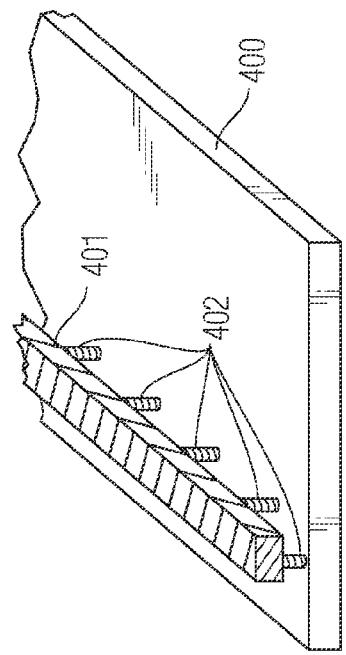

FIGS. 4A-D show various methods of connecting the common bus line to the common electrode according to some embodiments of the invention. In FIG. 4A the common bus line 401 is immediately above the common electrode 400. In FIG. 4B, the common bus line 401 is immediately below the common electrode 400. In FIG. 4C, the common bus line 401 is above the common electrode 400, but not immediately above it. Instead, there may be some space between the common electrode and the common bus line. This space may be occupied by another layer, such as a dielectric. Connections 402 can be used to connect the common electrode to the common bus line instead. In FIG. 4D, the common bus line is placed at the same layer as the common electrode.

It should be noted that the configurations shown in FIGS. 4A-4D are not the only configurations for embodiments of this invention. For example, the common bus line can be placed below the common electrode but not immediately below it and may utilize connections to connect to the common electrode. Also, FIGS. 4A-D show a solid common electrode, which would indicate a common electrode on the bottom configuration. Those of skill in the art would recognize the connections of FIGS. 4A-4D can be easily applied to a common electrode on top configuration.

In the interest of clarity, FIGS. 4A-4D do not show all components of the display.

FIG. 5 is a diagram showing embodiments of the present invention in various stages of manufacturing. Diagrams 501-509 represent different stages of the manufacturing of a substrate assembly that result from placing different elements on a substrate (which may be, e.g., a glass substrate). More specifically, stages 501-509 are progressive stages of manufacturing of a display pixel on a substrate in which various features are sequentially placed on the substrate and thus added to the substrate assembly. Thus, every stage can include all the elements of its predecessor stage.

Elements formed when manufacturing the substrate assembly are considered to be formed on the substrate and part of the substrate assembly even if they are not formed directly on the substrate but are formed on top of other elements that are formed on the substrate. There are, however, other layers that are part of the display but are not formed on the substrate or on another element that is formed on the substrate. These are instead separately produced and later combined with the substrate. These layers can include filters, polarizers, liquid crystals, other substrates, etc. They may not considered to be part of the substrate assembly.

At stage 501, poly-silicon 519 is placed on the substrate. Stages 502-504 are not shown, but they are conventional. In stage 502 a first metal layer is placed. This can form, for example, gate line 510. In stage 503, a first dielectric/connection layer is placed. In stage 504, a second metal layer is placed. The second metal layer can form, for example, data line 511. In stage 505, a second dielectric/connection layer is placed. At this point a transistor 517 is formed. The transistor has a source connected to the data line 511, a gate connected to the gate line 510 and a drain 518 that will be connected to the pixel electrode (see below).

In stage 506, a common ITO layer is placed. The common ITO layer can form common electrode 512. In FIG. 5, the common electrode 512 is placed (e.g., deposited or otherwise fabricated) in the common electrode at the bottom configuration.

In stage 507 another metal feature can be placed. This is referred to the common metal stage and can involve placing the common bus line 514. The common bus line can be placed directly above and parallel to the gate line 510 in order to ensure that placement of the common bus line does not decrease the aperture of the cell. As noted above, in some embodiments, the common bus line need not line up with the gate line exactly. For example, the common bus line 514 may be slightly thicker or slightly displaced from the gate line and thus may cause a slight decrease in aperture.

Furthermore, the common bus line 514 can be placed on the same layer as the common electrode 512 and can share a side with it (see, e.g., FIG. 4D). It should be noted that the common bus line can be insulated from the gate line 510 by, for example the dielectric applied at stage 505. At stage 509, the pixel electrode 515 is placed. Since this embodiment is of the pixel electrode on top type, the pixel electrode is placed above the common electrode and has a comb like shape (see, e.g., FIG. 1A). As with the common electrode, the pixel electrode can be formed from ITO. The pixel electrode 515 can be connected to the drain 518 of transistor 517 by way of connection 520.

It can be seen that the aperture ratio 516 is not significantly decreased from what it would have been had the common bus line 514 been absent. In other words, the placement of common bus line 514 does not overlap any areas that could have otherwise been used for the display functionality. To the contrary, the common bus line 514 overlaps areas that are already opaque due to other needed elements (e.g., gate line 510).

Figure 6:
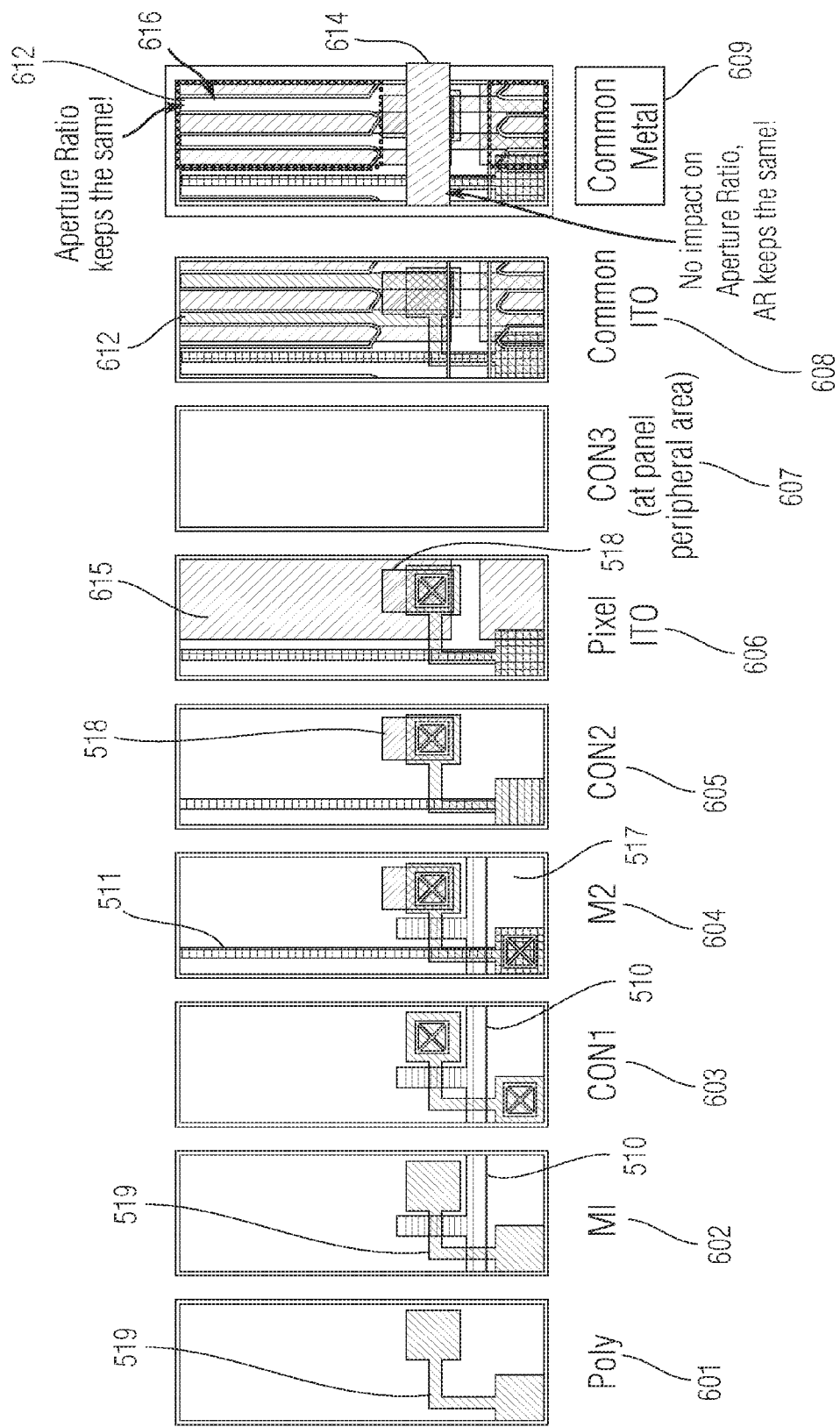
FIG. 6 is another diagram of various manufacturing stages of an exemplary display according to one embodiment of the invention.

FIG. 6 is a diagram of various manufacturing stages of an exemplary display according to one embodiment of the invention. In contrast to FIG. 5, FIG. 6 shows a common electrode on top configuration. Stages 601-605 are similar to stages 501-505, respectively. As with the embodiment of FIG. 5, a transistor 517 is formed at step 604. The transistor can be the same as transistor 517 of FIG. 5. At stage 606, the pixel electrode 615 is initially deposited. The pixel electrode is connected to the drain 518 of transistor 517. Stage 607 is a connection and dielectric layer. At stage 608, the common electrode 612 is placed. In this embodiment, the common electrode is above the pixel electrode. Thus, the common electrode can be comb-like, as shown (see also FIG. 1B).

At stage 609, the common bus line 614 is placed. The common bus line may be placed at the same layer as the common electrode 616 and may share a side with it to provide an electrical connection (see, e.g., FIG. 4D). It should be noted that in this embodiment the common bus line does not overlap gate line 514. This is not required—the common bus line can overlap the gate line 510 in other common electrode on top embodiments. However, in this embodiment, the common bus line 614 is positioned a little forward in relation to the gate line 510. Nevertheless, the common bus line does not substantially (or at all) reduce the aperture of the device, because it is placed directly above other opaque features of the device, such as the drain 518 of transistor 517 and the poly-silicon 519.

Other embodiments may feature configurations different from those shown in FIGS. 5 and 6. For example, the common bus line 514/614 can be positioned below the gate line or above or below the data line 511.

Figure 7:
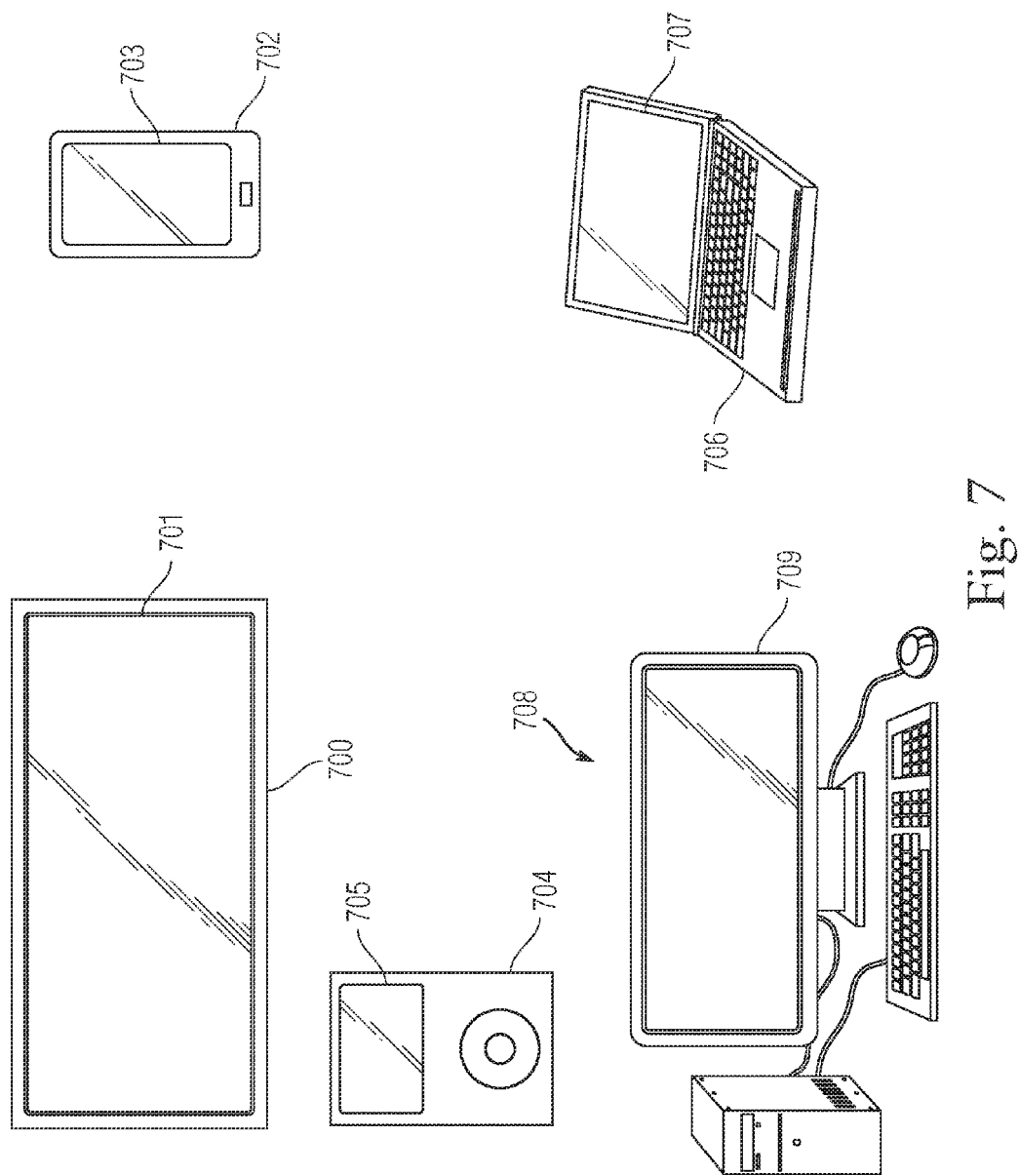
FIG. 7 is diagrams of various end user devices that may implement embodiments of the present invention.

Embodiments of the present invention can be implemented in various types of devices. For example, with reference to FIG. 7, embodiments of the present invention can be implemented as flat screen television set 700 with display 701, a mobile telephone 702 with display 703, a mobile device (such as a mobile music player) 704 with display 705, a laptop computer 706 with display 707, or a desktop computer 708 with a display 709. Other types of devices may also be produced. As discussed above, embodiments of the invention may allow the above-referenced devices to provide a clear and bright display with a relatively high resolution, high refresh rate and a wide viewing angle.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A display including a substrate assembly, the substrate assembly comprising:
   a transparent conducting common electrode;
   a plurality of opaque display elements; and
   a plurality of common bus lines made from a non-transparent conductor, the non-transparent conductor having a lower resistance than the transparent conducting common electrode, the common bus lines connected to the common electrode and positioned at a different layer in the substrate assembly than the opaque display elements such that the opaque display elements overlap substantially the entirety of the common bus lines; and
   wherein the plurality of opaque display elements includes at least a plurality of gate lines wherein the at least the plurality of gate lines overlap substantially the entirety of the common bus lines.

2. The display of claim 1, wherein the opaque display elements completely overlap the common bus lines.

3. The display of claim 1, wherein the common bus line is connected to the common electrode at multiple points.

4. The display of claim 1, wherein the common bus line shares a side with the common electrode.

5. The display of claim 1, wherein individual ones of the plurality of the gate lines are associated with individual ones of the plurality of common bus lines, overlap substantially the entirety of at least its associated common bus line and run substantially parallel thereto.

6. The display of claim 5, wherein the plurality of opaque display elements additionally include a plurality of data lines wherein the plurality of data lines overlap at least portions of the common bus lines.

7. The display of claim 1, wherein the plurality of opaque display elements additionally include transistors or portions thereof.

8. The display of claim 1, wherein the substrate assembly further includes a pixel electrode positioned in proximity to the common electrode, and a voltage between the pixel electrode and the common electrode determines a display functionality of a particular pixel.

9. The display of claim 8, wherein the pixel electrode is positioned above the common electrode and the pixel electrode has a comb-like shape.

10. The display of claim 8, wherein the common electrode is positioned above the pixel electrode and the common electrode has a comb like shape.

11. A mobile telephone comprising the display of claim 1.

12. A portable audio device comprising the display of claim 1.

13. A television set comprising the display of claim 1.

14. A display having a substrate assembly, the substrate assembly comprising:
   a transparent conducting common electrode;
   a plurality of opaque display elements; and
   a plurality of common bus lines made from a non-transparent conductor, the non-transparent conductor having a lower resistance than the transparent conducting common electrode, the common bus lines connected to the common electrode and positioned at a different layer in the substrate assembly than the opaque display elements such that, despite the existence of the common bus lines, an aperture of the display can be maintained at any reference aperture that would have been possible in the absence of the plurality of common bus lines such that the opaque display elements substantially overlap substantially the entirety of the common bus lines; and
   wherein the plurality of opaque display elements includes at least a plurality of gate lines wherein the at least the plurality of gate lines overlap substantially the entirety of the common bus lines.

15. The display of claim 14, wherein the opaque display elements completely overlap the common bus lines.

16. The display of claim 14, wherein individual ones of the plurality of the gate lines are associated with individual ones of the plurality of common bus lines, overlap substantially the entirety of at least its associated common bus line and run substantially parallel thereto.

17. A mobile telephone including a display having a substrate assembly, the substrate assembly comprising:
   a transparent conducting common electrode;
   a plurality of opaque display elements; and
   a plurality of common bus lines made from a non-transparent conductor, the non-transparent conductor having a lower resistance than the transparent conducting common electrode, the common bus lines connected to the common electrode and positioned at a different layer in the substrate assembly than the opaque display elements such that the opaque display elements overlap substantially the entirety of the common bus lines; and
   wherein the plurality of opaque display elements includes at least a plurality of gate lines wherein the at least the plurality of gate lines overlap substantially the entirety of the common bus lines.

18. A portable audio device including a display having a substrate assembly, the substrate assembly comprising:
   a transparent conducting common electrode;
   a plurality of opaque display elements; and
   a plurality of common bus lines made from a non-transparent conductor, the non-transparent conductor having a lower resistance than the transparent conducting common electrode, the common bus lines connected to the common electrode and positioned at a different layer in the substrate assembly than the opaque display elements such that the opaque display elements substantially overlap the common bus lines;
   wherein the plurality of opaque display elements includes at least a plurality of gate lines wherein the at least the plurality of gate lines overlap substantially the entirety of the common bus lines.

19. A method for producing a display including manufacturing a substrate assembly by:
   forming a transparent conducting common electrode on a substrate;
   forming a plurality of opaque display elements on the substrate;
   forming on the substrate a plurality of common bus lines made from a non-transparent conductor, the non-transparent conductor having a lower resistance than the transparent conducting common electrode, by positioning the common bus lines at a different layer in the substrate assembly than the opaque display elements such that the opaque display elements overlap substantially the entirety of the common bus lines, and connecting the common bus lines to the common electrode; and wherein the plurality of opaque display elements includes at least a plurality of gate lines wherein the at least the plurality of gate lines overlap substantially the entirety of the common bus lines.

20. The method of claim 19, wherein the opaque display elements completely overlap the common bus lines.

21. The method of claim 19, further comprising connecting the common bus line to the common electrode at multiple points.

22. The method of claim 19, further comprising forming the common bus line next to the common electrode so that they share a side.

23. The method of claim 19, wherein individual ones of the plurality of the gate lines are associated with individual ones of the plurality of common bus lines, overlap substantially the entirety of at least its associated common bus line and run substantially parallel thereto.

24. The method of claim 23, wherein the plurality of opaque display elements additionally include a plurality of data lines wherein the plurality of data lines overlap at least portions of the common bus lines.

25. The method of claim 19, wherein forming the plurality of opaque display elements additionally includes forming transistors or portions thereof.

26. The method of claim 19, further including forming on the substrate a pixel electrode positioned in proximity to the common electrode so that a voltage between the pixel electrode and the common electrode determines a display functionality of a particular pixel.

27. The method of claim 26, wherein the pixel electrode is positioned above the common electrode and the pixel electrode has a comb-like shape.

28. The method of claim 26, wherein the common electrode is positioned above the pixel electrode and the common electrode has a comb like shape.

* * * * *